US 8,275,935 B2

(12) United States Patent
Suzuki

(10) Patent No.: US 8,275,935 B2
(45) Date of Patent: *Sep. 25, 2012

(54) SEMICONDUCTOR STORAGE DEVICE AND CONTROL METHOD THEREOF

(75) Inventor: Hirotaka Suzuki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/279,118

(22) Filed: Oct. 21, 2011

(65) Prior Publication Data

US 2012/0042119 A1    Feb. 16, 2012

Related U.S. Application Data

(62) Division of application No. 13/016,529, filed on Jan. 28, 2011, now Pat. No. 8,140,741.

(30) Foreign Application Priority Data

Jan. 29, 2010    (JP) .................................. 2010-019545

(51) Int. Cl.
*G06F 12/00* (2006.01)
(52) U.S. Cl. ........................................................ 711/103
(58) Field of Classification Search .................. None
See application file for complete search history.

(56) References Cited

U.S. PATENT DOCUMENTS

| 7,783,682 | B1 * | 8/2010 | Patterson ...................... 707/813 |
| 2008/0235467 | A1 | 9/2008 | Tagawa |
| 2009/0198947 | A1 * | 8/2009 | Khmelnitsky et al. ........ 711/202 |
| 2011/0138105 | A1 * | 6/2011 | Franceschini et al. ........ 711/103 |
| 2011/0191528 | A1 | 8/2011 | Suzuki |
| 2011/0191566 | A1 * | 8/2011 | Takamiya et al. ............. 711/206 |
| 2011/0225346 | A1 * | 9/2011 | Goss et al. ..................... 711/103 |

FOREIGN PATENT DOCUMENTS

| JP | 03-141442 | 6/1991 |
| JP | 04-157699 | 5/1992 |
| JP | 06-222985 | 8/1994 |
| JP | 2002-182975 | 6/2002 |
| JP | 2003-228513 | 8/2003 |
| JP | 2008-146253 | 6/2008 |
| JP | 2008-146341 | 6/2008 |
| JP | 2008-242503 | 10/2008 |
| WO | WO 2008/038372 | 4/2008 |

OTHER PUBLICATIONS

Suzuey & Suzuye, "Information Sheet for preparing an Information Disclosure Statement under Rule 1.56", undated.
Notice of Reasons of Rejection mailed by the Japan Patent Office on Apr. 19, 2011 in the corresponding Japanese patent application No. 2010-019545 in 8 pages.

* cited by examiner

*Primary Examiner* — Hiep Nguyen
(74) *Attorney, Agent, or Firm* — Knobbe, Martens, Olson & Bear, LLP

(57)    ABSTRACT

According to one embodiment, a semiconductor storage device comprises a main memory, a request issue module, a delay module, and an access module. The main memory is configured to store candidate information for determining a compaction candidate for a nonvolatile memory. The request issue module is configured to issue an access request for the candidate information in the main memory. The delay module is configured to delay the access request issued from the request issue module. The access module is configured to access the candidate information in the main memory based on an access request delayed by the delay module.

11 Claims, 3 Drawing Sheets

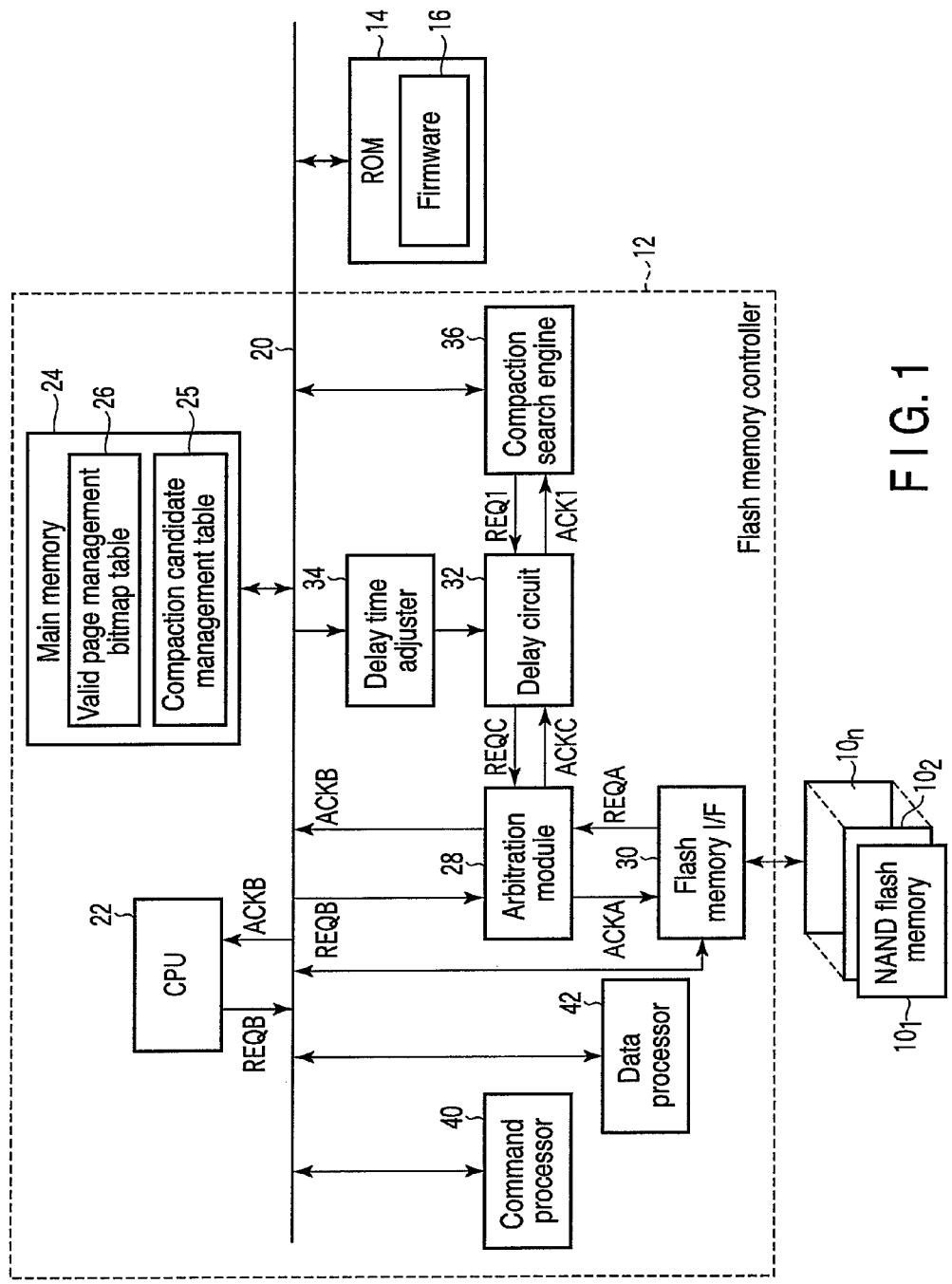
F I G. 1

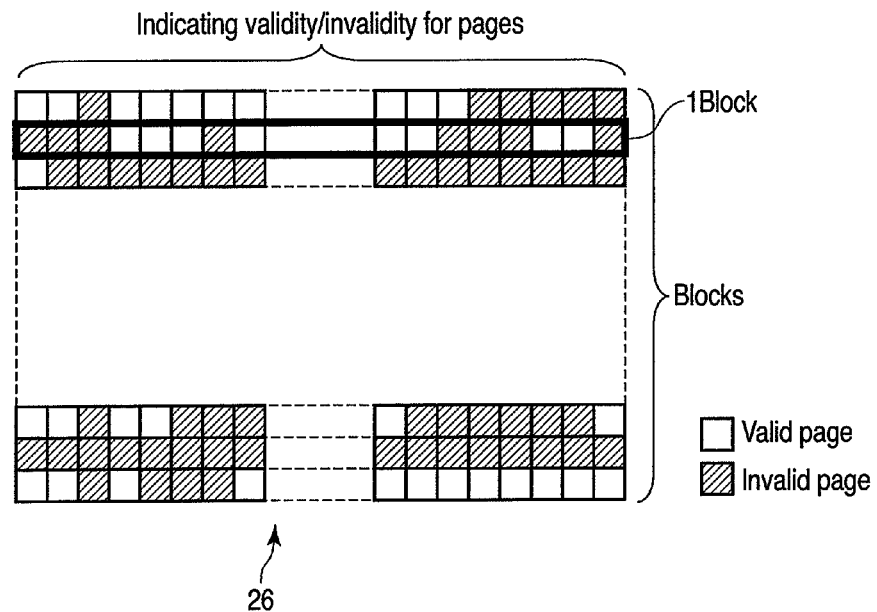
F I G. 2
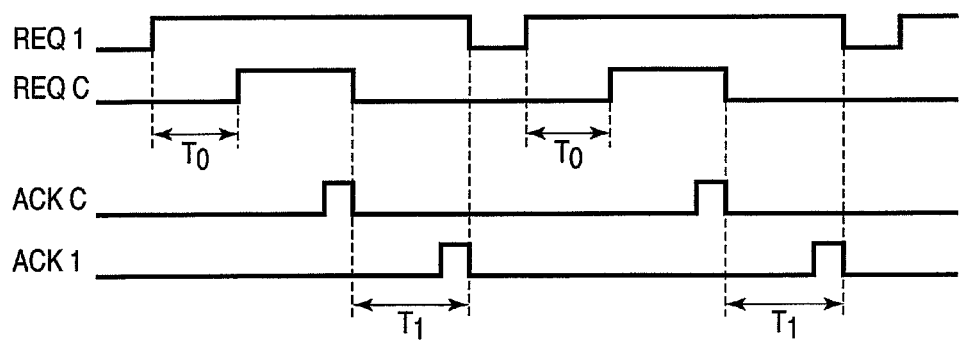
F I G. 4

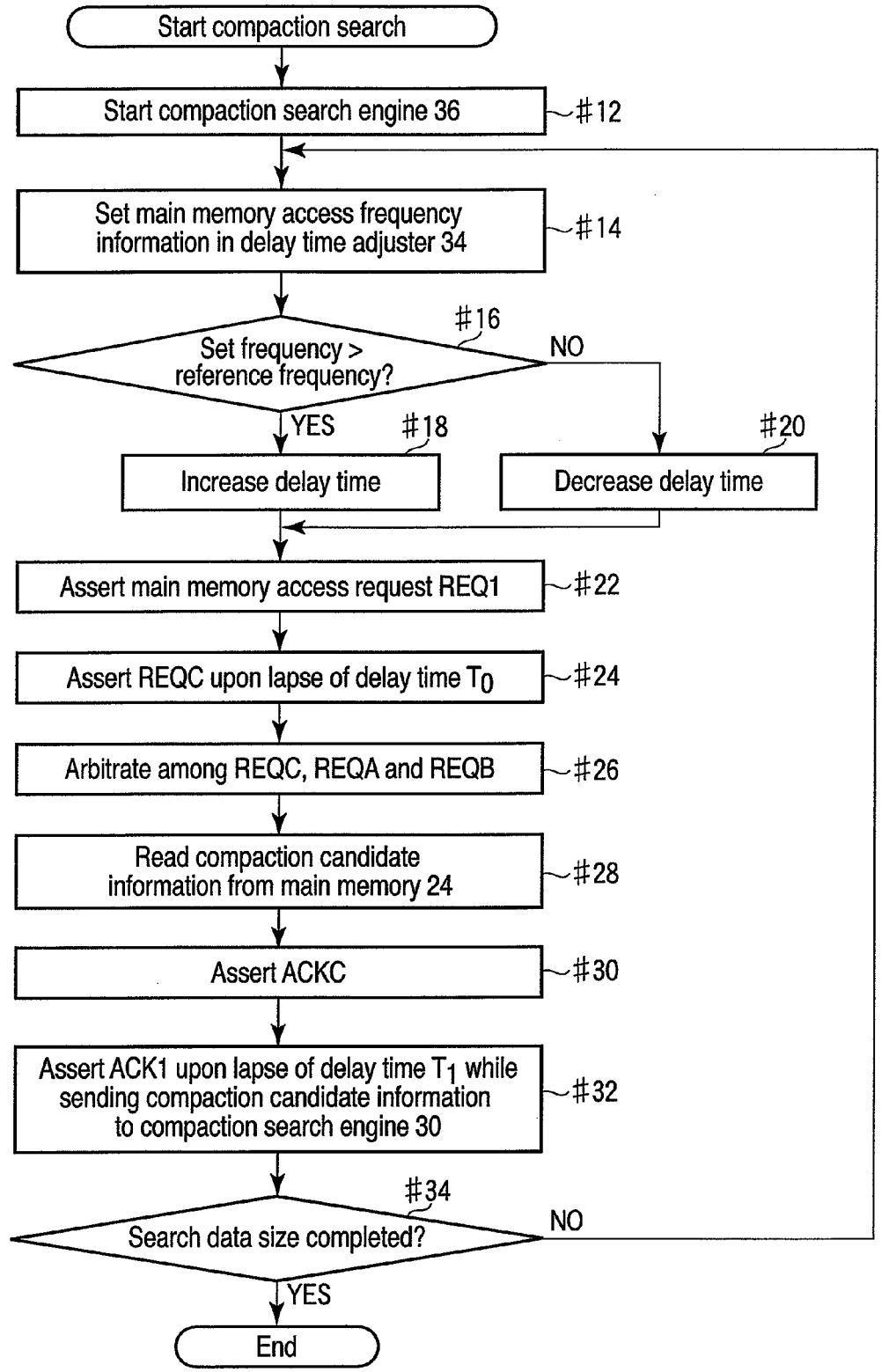
F I G. 3

SEMICONDUCTOR STORAGE DEVICE AND CONTROL METHOD THEREOF

CROSS-REFERENCE TO RELATED APPLICATIONS

This application is a divisional of U.S. patent application Ser. No. 13/016,529 filed on Jan. 28, 2011, which is based upon and claims the benefit of priority from Japanese Patent Application No. 2010-019545, filed Jan. 29, 2010, the entire contents of each of which are incorporated herein by reference.

FIELD

Embodiments described herein relate generally to a semiconductor storage device using a flash memory and a control method thereof.

BACKGROUND

Generally, in a nonvolatile memory such as a flash memory, data cannot be overwritten on stored data, and is required to be written after the stored data is erased. The repeated write and erase operations leave unwanted divided areas where the data remain unerased. The process of erasing these unwanted areas and forming a continuous area having no data written therein is called compaction or garbage collection. The garbage collection process in a conventional semiconductor storage device is described in, for example, Jpn. Pat. Appln. KOKOAI Publication No. 6-222985 (Paragraphs 0011 to 0015, 0028, 0039 and 0050).

According to this conventional technique, data D is written at an address (A, a) of a memory based on a write request from a host. After that, in response to another write request from the host to the frame of address (A, a), a new version of data D-1 is written in the data field of, for example, an address (B, m) where no data is written as yet. In the pointer field of the address (A, a), "B, m" is written as the address of the link destination. After that, in response to another request from the host to write in the address (A, a), data D-2 is written in a frame having no data written therein such as the data field of an address (C, n). In the pointer field of the address (B, m), "C, n" is written as the address of the link destination.

In the case where the garbage collection is effected in this manner, the frame of the address (B, m) only indicates the link relation and has no meaning as data. Therefore, this frame of "B, m" is erased by the garbage collection process.

In this process, the first step is to save the frame data of the address (A, a) in a buffer, and the pointer thereof is rewritten to "C, n" on the buffer. At the same time, the data of the addresses (B, m) and (A, a) are erased. After that, the data of the address (A, a) for which the pointer is rewritten is written in the same address of the memory. As a result, the link destination of the address (A, a) directly changes to (C, n), and the frame of the address (B, m) becomes the one in which the data can be written.

In the case where the rewrite control operation is performed according to the pointer field as described above, however, the link destination is required to be tracked in response to a write request from the host, thereby posing a problem that a considerable time is required. In view of this, a table including a designated address field, a valid bit field and a logic address field is provided according to Jpn. Pat. Appln. KOKOAI Publication No. 6-222985. The designated address field indicates the address designated by the host at the time of accessing data in the nonvolatile memory from the host. The valid bit field indicates whether the data is stored in the corresponding block of the memory. In the logic address field, the address designated by the host is logically converted to determine the address of the block of the memory.

A garbage collection controller has a preset threshold value, and upon reception of a write request from the host, determines, with reference to the table described above, whether the sum of the number of blocks in which the data is written and the number of memory blocks for executing the write request exceeds a threshold value or not. In the case where the sum exceeds the threshold value, the garbage collection control unit carries out the garbage collection for the memory. The threshold value is set at an appropriate value such as a value representing 90% of the replacement area of the memory. Since the garbage collection is carried out based on the threshold value as described above, the requirement to execute the garbage collection process while the write request from the host is being processed can be avoided.

Further, according to Jpn. Pat. Appln. KOKOAI Publication No. 6-222985, the garbage collection control unit has a timer function. Thus, the garbage collection controller monitors the operation of the blocks of the memory with reference to the table, and in the case where the state of a particular memory block is not more than the threshold value, writes the data in the memory block while setting the timer. In the case where the state of the memory block is more than the threshold value, on the other hand, the garbage collection is carried out for the memory while resetting the timer. The garbage collection controller thus carries out the garbage collection upon lapse of a predetermined time with the timer set. Also by carrying out the garbage collection at regular time intervals in this way, the requirement to execute the garbage collection process while the write request from the host is being processed can be avoided.

The device described in Jpn. Pat. Appln. KOKOAI Publication No. 6-222985 carries out the garbage collection at regular time intervals. In order to carry out the garbage collection, the garbage collection controller is required to access the table and search for an address of a frame in which no data is written. This poses a problem that the search process represents a considerable part of the time of the garbage collection as a whole.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 1 is an exemplary diagram showing a semiconductor storage device according to an embodiment.

FIG. 2 is an exemplary diagram showing a valid page management bitmap table for compaction search.

FIG. 3 is an exemplary flowchart showing the compaction search according to an embodiment.

FIG. 4 is an exemplary diagram showing an access request and a state of a delay circuit for delaying acknowledgment of the access request.

DETAILED DESCRIPTION

Various embodiments will be described hereinafter with reference to the accompanying drawings.

In general, according to one embodiment, a semiconductor storage device comprises a main memory, a request issue module, a delay module, and an access module. The main memory is configured to store candidate information for determining a compaction candidate for a nonvolatile memory. The request issue module is configured to issue an access request for the candidate information in the main memory. The delay module is configured to delay the access request issued from the request issue module. The access module is configured to access the candidate information in the main memory based on an access request delayed by the delay module.

FIG. 1 is a diagram showing the general configuration of a semiconductor storage device according to a first embodiment. The semiconductor storage device includes plural semiconductor nonvolatile memories such as NAND flash memories $10_1, 10_2, \ldots, 10_n$ and a flash memory controller 12. Each of the flash memories $10_1, 10_2, \ldots, 10_n$ includes, for example, 2 to 16 memory chips. The flash memory controller 12 includes a flash memory interface 30 connected to the flash memories $10_1, 10_2, \ldots, 10_n$. In the case where the flash memories $10_1, 10_2, \ldots, 10_n$ are accessible in parallel, though not shown, there are provided the number n of the flash memory interfaces 30 connected to the flash memories $10_1, 10_2, \ldots, 10_n$, respectively. The flash memory interface 30 controls the flash memories $10_1, 10_2, \ldots, 10_n$ individually for the operation mode such as "program", "read", "erase", etc.

The flash memory controller 12 includes a CPU 22, a main memory 24, a command processor 40, a data processor 42, an arbitration module 28 and a compaction search engine 36. These component elements are connected to a CPU bus 20. The main memory 24 is formed of a DRAM and includes an in-block valid page management bitmap table 26 and a compaction candidate management table 25 for the compaction process of the flash memories $10_1, 10_2, \ldots, 10_n$.

An external ROM 14 is connected to the CPU bus 20 of the flash memory controller 12. The ROM 14 includes a firmware 16. The firmware 16, using the CPU 22, issues a read command and a write command to the flash memories $10_1, 10_2, \ldots, 10_n$ by I/O command access into the flash memory interface 30.

The flash memory interface 30, upon acceptance of a command from the CPU 22, transfers the data between the NAND flash memories $10_1, 10_2, \ldots, 10_n$ and the main memory 24.

The firmware 16 is adapted to operate in such a manner that the contents programmed in the ROM 14 are transferred to a temporary memory in the CPU 22 or the main memory 24 at the time of switching on the system power supply.

The in-block valid page management bitmap table 26 is configured, as shown in FIG. 2, in the form of a bitmap to indicate whether each page of the NAND flash memories $10_1, 10_2, \ldots, 10_n$ is valid or invalid. The whole of the NAND flash memories $10_1, 10_2, \ldots, 10_n$ is divided into a predetermined number of bytes, say, 2,112 bytes each forming one page, so that a predetermined number of pages or 64 pages, for example, make up one block. The term "valid" means that there exists data written in a page in valid form. The term "invalid", on the other hand, means that nothing is written in a page or the data previously written in the page is invalidated (overwritten with another data).

Once the write operation in the NAND flash memories $10_1, 10_2, \ldots, 10_n$ is performed, the validity/invalidity of the in-block valid page management bitmap table 26 is updated. In the process, the write operation from the firmware 16 is performed using a logical block address (LBA). The data is actually written in the NAND flash memories $10_1, 10_2, \ldots, 10_n$, therefore, after converting the logical address into a physical address (block address or page address).

In order to prevent the extreme reduction of a service life due to the repeated write operation in the same cell in the NAND flash memories $10_1, 10_2, \ldots, 10_n$, the compaction process is executed. In the compaction process, although the data is written a plurality of times with the same LBA, the data is newly written in the page of a physical address different from the previously written one and the data stored in the page of the previously written physical address is invalidated. The in-block valid page management bitmap table 26 carries out this validity/invalidity management.

During the system operation performed with this write operation, therefore, a block with a few number of valid pages (i.e. a block as a candidate for the compaction process) is generated without fail sooner or later.

The firmware 16 uniquely counts the number of valid pages in a block, and in the case where the number of valid pages is not more than a predetermined number, enters the particular block in a compaction candidate management table 25 as one of the objects of compaction. Any one of the blocks in the table 25 is applied to the compaction process. The compaction process is defined as the operation to collect the valid page data in a plurality of blocks for compaction, move the collected valid page data to another block, invalidate the pages of the blocks for compaction and thus generate a vacant block in which nothing is written.

The compaction search engine 36 is included as hardware dedicated to count the number of the in-block valid pages indicated by the in-block valid page management bitmap table 26. The firmware 16, by activating the engine 36 regularly or uniquely, accesses the in-block valid page management bitmap table 26 in the main memory 24, and then, by counting the number of the in-block valid pages and specifying the object of compaction by search, adds it to the compaction candidate management table 25. Sometimes during the search operation, therefore, the access is concentrated on the main memory 24 temporarily, with the occasional result that the memory access required for data transfer to the NAND flash memories $10_1, 10_2, \ldots, 10_n$ or the CPU 22 is hampered, thereby deteriorating performance to provide a user with the data at high speed.

According to this embodiment, an access request REQ1 issued from the compaction search engine 36 to the main memory 24 to search the in-block valid page management bitmap table 26 is delayed through the delay circuit 32 and supplied to the arbitration module 28 as a request REQC. The arbitration module 28, supplied with not only request REQC but also an access request REQA to the main memory 24 issued from the flash memory interface 30 and an access request REQB to the main memory 24 issued from the CPU 22, makes arbitration among the three requests REQA, REQB and REQC to determine one of the requests having the right to use the bus 20. As a result of this arbitration, the access requests granted the right to use the bus 20 are fulfilled sequentially. Upon complete access to the main memory 24 with the right thus granted to use the bus 20, acknowledge signals ACKC, ACKA and ACKB are returned to the delay circuit 32, the flash memory interface 30 and the CPU 22.

The delay circuit 32, by delaying acknowledgment ACKC also, like request REQ1 (the delay time may or may not be the same as that for request REQ1), transmits it as an acknowledgment ACK1 to the compaction search engine 36. The delay time of the delay circuit 32 is adjusted by a delay time adjuster 34 with an adjustment value set by the CPU 22. The CPU 22 is adapted to detect the frequency with which the main memory 24 is accessed in response to the command managed by the firmware 16. Therefore, the delay time is adjusted in accordance with the frequency with which the main memory 24 is accessed. Alternatively, the frequency with which the main memory 24 is accessed may be detected by monitoring the bus 20 directly with the hardware, not shown, without using the command managed by the firmware 16.

The flash memory controller 12 includes a command processor 40 and a data processor 42. The command processor 40 supplies the read command and the write command from the CPU 22 to the NAND flash memories $10_1, 10_2, \ldots, 10_n$. The data processor 42 processes the read data and the write data from the NAND flash memories $10_1, 10_2, \ldots, 10_n$.

FIG. 3 is a flowchart showing the compaction search process. In block #12, the CPU 22 starts the compaction search engine 36 to conduct the compaction search. The compaction search engine 36, when started, is supplied with a search start address and a search data size. The compaction search engine 36 reads the data in the area of the main memory 24 designated by these information. Specifically, the initial value of the search start address is the first address of the in-block valid page management bitmap table 26 of the main memory 24, and the search data size is the size of the in-block valid page management bitmap table 26. The CPU 22 can start the compaction search even during the transfer of the user data and the data for the NAND flash memories $10_1, 10_2, \ldots, 10_n$.

In block #14, the CPU 22 detects the frequency with which the main memory 24 is accessed, based on the command managed by the firmware 16, and sets the access frequency information in the delay time adjuster 34. In block #16, it is determined whether the access frequency is higher than a reference frequency. If the access frequency is higher than the reference frequency, the delay time is lengthened in block #18. If the access frequency is lower than the reference frequency, on the other hand, the delay time is shortened in block #20. As a result, the delay time of the delay circuit 32 is increased in the case where the access frequency is high, and vice versa. The delay time for request REQ1 and the delay time for acknowledgment ACKC may or may not be same as each other.

In block #22, the compaction search engine 36 asserts access request REQ1 to the main memory 24. Upon lapse of delay time $T_0$ after assertion of access request REQ1, access request REQC to the arbitration module 28 is asserted in block #24. With the increase in delay time $T_0$, therefore, the frequency with which access request REQ1 is issued from the compaction search engine 36 to the main memory 24 is decreased.

In block #26, the arbitration module 28 carries out an ordinary arbitration (the arbitration for the right to use the bus 20) among access request REQA to the main memory 24 issued by the flash memory interface 30, access request REQB to the main memory 24 issued by the CPU 22 and access request REQC issued from the delay circuit 32 (access request REQ1 issued from the compaction search engine 36, as delayed by time $T_0$). Once access request REQC comes to have the right to use the bus 20, the data in the valid page management bitmap table 26 is accessed in block #28, thereby reading the candidate information for determining the compaction candidate (the information on the validity/invalidity of each page to find a block for which the number of in-block valid pages is not more than a predetermined number). Incidentally, the data size for one access in block #28 is, for example, 16 bytes, and in each compaction search session, the 16-byte data on the valid page management bitmap table 26 is accessed.

After the data (compaction candidate information) is read from the valid page management bitmap table 26, the arbitration module 28 asserts acknowledgment ACKC in block #30. The delay circuit 32 asserts acknowledgment ACK1 to the compaction search engine 36 in block #32 upon lapse of delay time $T_1$ from the assertion of acknowledgment ACKC. The compaction candidate information thus read, together with acknowledgment ACK1, is sent to the compaction search engine 36. The compaction candidate information is entered in the compaction candidate management table 25 by the compaction search engine 36.

In block #34, it is determined whether the data of the search data size is searched for or not. If the answer is negative, the process returns to block #14 and the next 16 bytes are searched on the valid page management bitmap table 26. This process is repeated until the data of the search data size designated at the starting time have been searched for. As a result, the compaction candidate information (for example, the blocks with not more than a predetermined number of the in-block valid pages) is stored in the compaction candidate management table 25.

In the compaction process, the compaction candidate information is read from the compaction candidate management table 25, the valid page data in the compaction candidate block is collected and moved to another block, the page of the origin is invalidated thereby to evacuate the compaction candidate block. The very compaction process can be executed at another appropriate timing after search. By conducting the search in advance, the compaction process can be executed efficiently.

FIG. 4 is a diagram for explaining the delay operation of the delay circuit 32. The delay circuit 32, though access request REQ1 is asserted for compaction search from the compaction search engine 36, asserts request REQC not immediately but after a predetermined delay time $T_0$. In similar fashion, acknowledgment ACKC asserted by the arbitration module 28 is also delayed by a predetermined delay time $T_1$ and returned to the compaction search engine 36 as an acknowledgment ACK1. The compaction search engine 36 cannot issue access request REQ1 for the next compaction search session without receiving acknowledgment ACK1 after access request REQ1 is issued.

Therefore, the frequency with which access request REQ1 is issued for compaction search is determined in accordance with the delay time $T_0, T_1$. According to this embodiment, the delay time $T_0, T_1$ correspond to the frequency with which the main memory 24 is accessed. As a result, the frequency with which access request REQ1 is issued for compaction search is controlled in accordance with the frequency with which the main memory 24 is accessed. Thus, the situation is eliminated in which the execution of the compaction search is concentrated in a given time zone and the access to the main memory 24 by the CPU 22 or the flash memory 10 is hampered by the compaction search. Further, in view of the fact that the frequency with which the compaction search is conducted is adjusted in accordance with the frequency with which the main memory 24 is accessed, the compaction search can be carried out during the period when the main memory 24 is not accessed. Thus, the compaction process can be executed efficiently without reducing the performance to access the main memory 24.

An explanation has been made above about an example in which the data of the valid page management bitmap table 26 is used as the candidate information to determine the compaction candidate stored in the main memory 24. Nevertheless, the very information indicating the number of valid pages for each block may alternatively be used with equal effect. Further, although acknowledgment ACKC asserted in the arbitration module 28 is delayed by the delay circuit 32 together with access request REQ1 for compaction search from the compaction search engine 36, the concentration of the issuance of access request REQ1 for compaction search can be prevented also by delaying only access request REQ1. Acknowledgment ACKC, therefore, may be delivered as it is to the compaction search engine 36 without being delayed. Furthermore, the delay time, though changed for each issue of access request REQ1 in accordance with the frequency with which the main memory is accessed, is not necessarily changed for each issue of the request but at regular time intervals.

According to the embodiment, the execution of the access request to the compaction candidate information in the main memory 24 is delayed, and therefore, the access to the main memory 24 for the compaction candidate information is prevented from being concentrated within a unit time. Thus, the original access to the main memory 24 for transfer of the user data is not hampered by the access for the compaction candidate information, thereby preventing the deterioration of the performance of the semiconductor storage device.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor storage device comprising:
   a nonvolatile memory;
   a controller configured to be connected to the nonvolatile memory, wherein the controller comprises
      a main memory configured to store candidate information for determining a compaction candidate for the nonvolatile memory;
      a request issue module configured to issue a first access request for the main memory for searching for the candidate information;
      a delay module configured to delay the first access request issued from the request issue module by a first time in accordance with an access frequency of the main memory;
      an arbitration circuit configured to perform arbitration of an access request; and
      an access module configured to access the candidate information in the main memory based on the first access request delayed by the first time by the delay module when the first access request is given a right by the arbitration circuit.

2. The device of claim 1,
   wherein the controller further comprises an acknowledgment issue module configured to issue a termination acknowledgment for the access by the access module, and
   wherein the termination acknowledgment issued by the acknowledgment issue module is returned to the request issue module after being delayed by a second time by the delay module in accordance with the access frequency of the main memory.

3. The device of claim 1,
   wherein the controller further comprises a detection module configured to detect the access frequency of the main memory, and
   wherein the first delay time and the second delay time are set longer when the access frequency detected by the detection module is higher than a predetermined frequency, and the first delay time and the second delay time are set shorter when the access frequency detected by the detection module is not higher than the predetermined frequency.

4. The device of claim 2, wherein the first delay time is different from the second delay time.

5. The device of claim 2, wherein the first delay time is equal to the second delay time.

6. The device of claim 1, wherein the nonvolatile memory comprises flash memories, and
   wherein the controller further comprises interfaces capable of accessing the flash memories in parallel.

7. A method of controlling a semiconductor storage device comprising a nonvolatile memory, and a main memory configured to store candidate information for determining a compaction candidate for the nonvolatile memory, the method comprising:
   issuing a first access request for the main memory for searching for the candidate information;
   delaying the issued first access request by a first time in accordance with an access frequency of the main memory;
   performing arbitration of an access request; and
   accessing the candidate information in the main memory based on the first access request delayed by the first time when the first access request is given a right by the arbitration.

8. The method of claim 7, further comprising:
   issuing a termination acknowledgment for the first access, and
   returning the issued termination acknowledgment to a source of the first access request after being delayed by a second time in accordance with the access frequency of the main memory.

9. The method of claim 7, further comprising:
   detecting an access frequency of the main memory, and
   wherein the first delay time and the second delay time are increased when the detected access frequency is higher than a predetermined frequency, and the first delay time and the second delay time are decreased when the detected access frequency is not higher than the predetermined frequency.

10. The method of claim 8, wherein the first delay time is different from the second delay time.

11. The method of claim 8, wherein the first delay time is equal to the second delay time.

* * * * *